J. D. FIELDS.
AGITATOR AND FILTER FOR TREATING ORES.
APPLICATION FILED SEPT. 13, 1913.
1,107,922.
Patented Aug. 18, 1914.
2 SHEETS—SHEET 1.
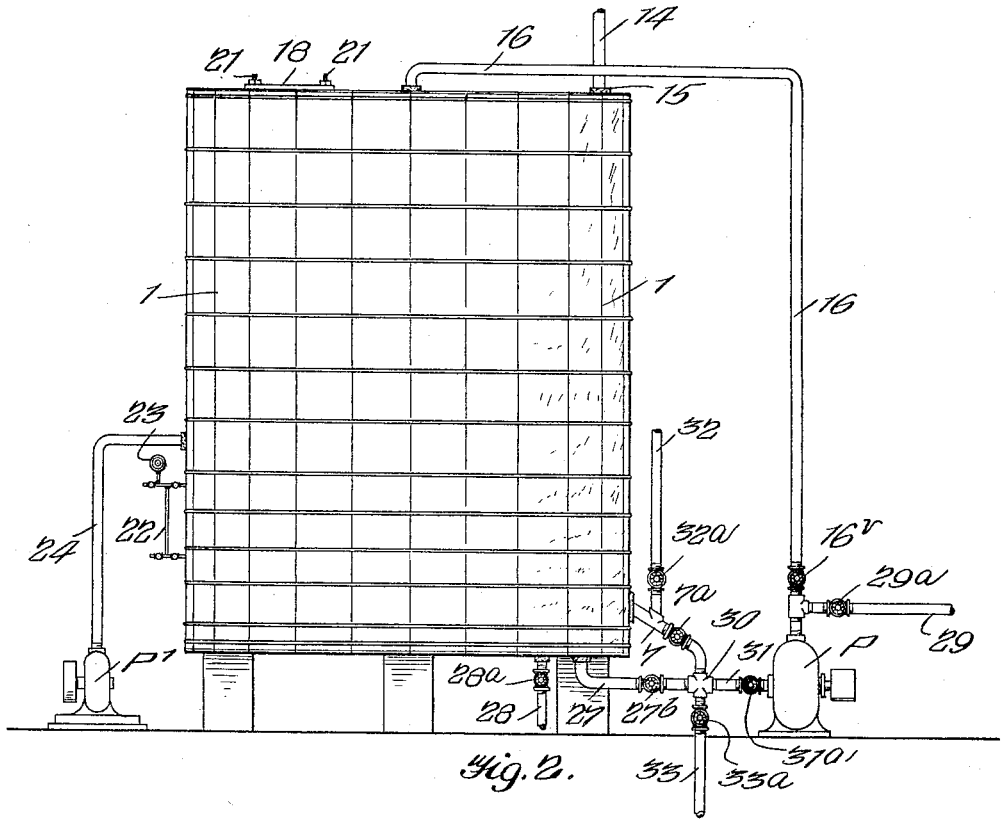
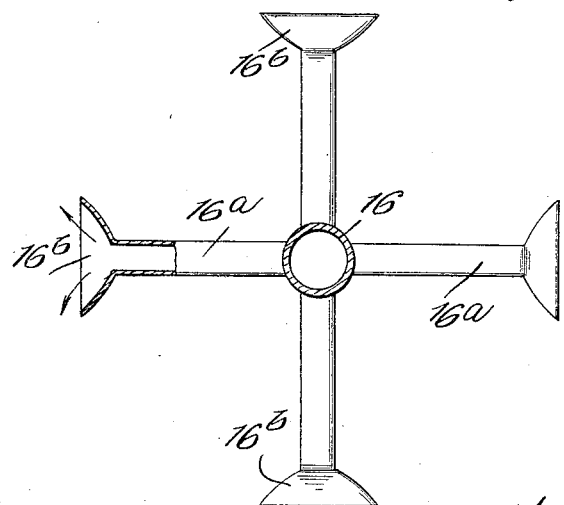
WITNESSES
E. M. Callaghan
L. A. Stanley
INVENTOR
JOHN D. FIELDS,
BY Munn & Co
ATTORNEYS

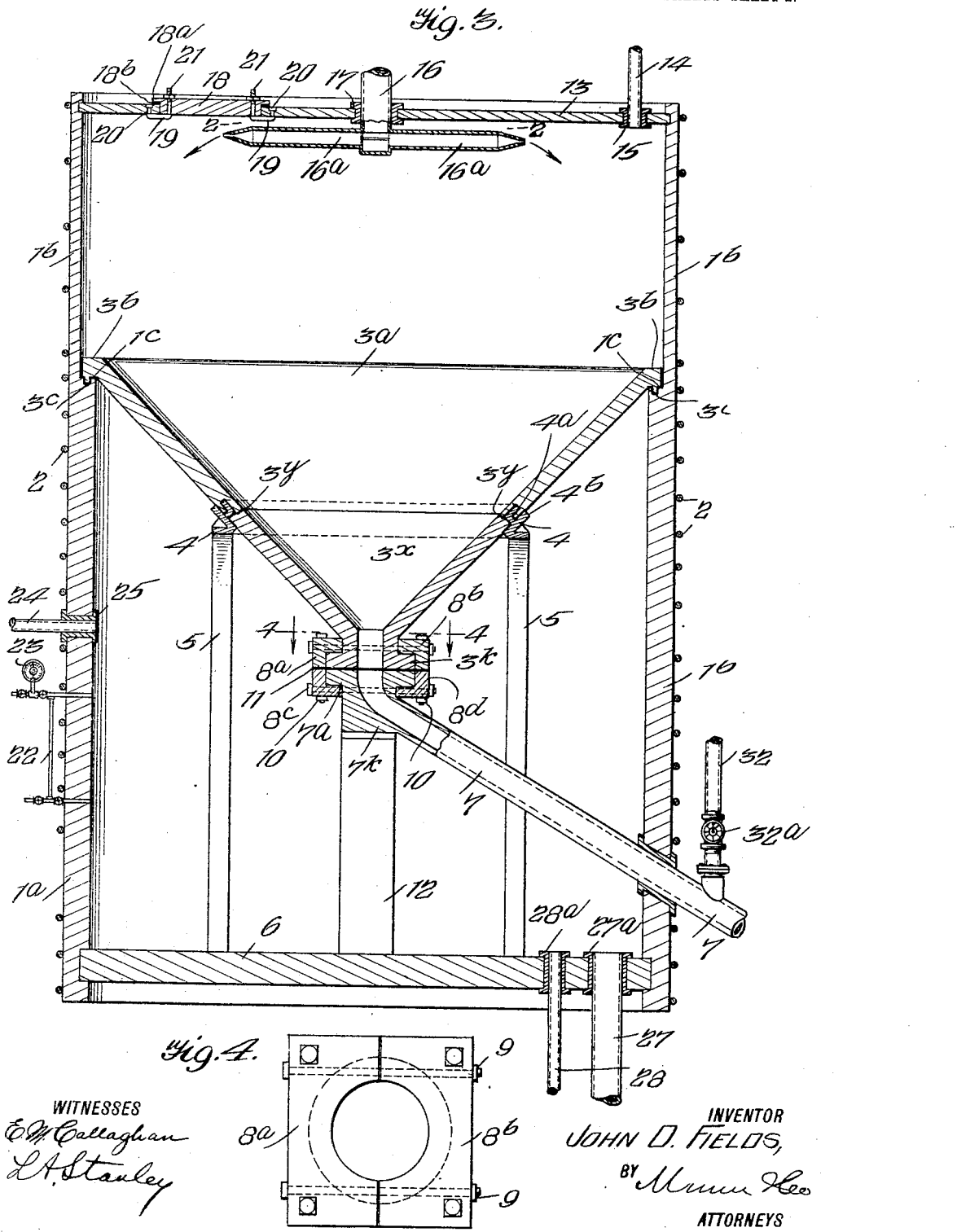

UNITED STATES PATENT OFFICE.

JOHN D. FIELDS, OF MAXVILLE, MONTANA.

AGITATOR AND FILTER FOR TREATING ORES.

1,107,922. Specification of Letters Patent. Patented Aug. 18, 1914.

Application filed September 13, 1913. Serial No. 789,639.

*To all whom it may concern:*

Be it known that I, JOHN D. FIELDS, a citizen of the United States, and a resident of Maxville, in the county of Granite and State of Montana, have invented a new and useful Improvement in Agitators and Filters for Treating Ores, of which the following is a specification.

My invention relates to an improvement in devices for treating ores and is more especially directed to agitators and filters for separating solutions from pulp, and it consists in the combinations, constructions and arrangement herein described and claimed.

An object of my invention is to provide an apparatus which may be used for the leaching of ores or bringing their metallic content into solution with the use of acid, corroding gases or corroding alkalis without necessitating any alteration of the apparatus.

A further object of my invention is to provide a means by which the leaching of ores may be expedited thereby reducing the cost of the operation.

A further object of my invention is to provide a means for handling the pulp from which the solution has been filtered.

A further object of my invention is to provide a novel method of leaching ores.

Other objects and advantages will appear in the following specification and the novel features of the invention will be particularly pointed out in the appended claims.

My invention is illustrated in the accompanying drawings forming a part of this application in which—

Figure 1 is a side view showing the apparatus as assembled, Fig. 2 is a plan view of the distributing pipes, a portion of the figure being shown in section. Fig. 3 is a vertical section through the device, and Fig. 4 is a plan view of a clamp.

In carrying out my invention I make use of a circular tank such as that shown at 1 in Fig. 1. This tank is preferably made of wood but may be made of other material. The staves which form the tank are thicker at their bottoms than at their tops as will be seen from Fig. 3. In Fig. 3 the thicker portion is denoted by $1^a$ and the thinner portion by $1^b$, this leaves an annular shoulder $1^c$ on the inside of the tank. The tank may be bound with hoops 2 of iron bands or other suitable material.

Arranged to rest on the shoulder $1^c$ within the tank is a porous stoneware filter member $3^a$ having a flange $3^b$ at its outer upper edge, the latter being provided with a tongue $3^c$ arranged to enter an annular groove in the shoulder $1^c$. A compression band or gasket is provided between the flange $3^b$ and the shoulder $1^c$, this band preferably extending into the annular groove as shown in order to form an air tight joint.

The bottom of the filter is formed by a cone-shaped member $3^x$. It is connected with the member $3^a$ by a tongue and groove joint $3^y$. A circular supporting member 4 is provided for holding the parts $3^a$ and $3^x$ of the filter in position. This member 4 is preferably made of iron and is covered with a mantle of pure, soft rubber. As will be clearly seen from the drawing, it is provided with flanges $4^a$ and $4^b$ between which a flange portion of the filter $3^a$ enters, thus locking the filter member in position. The locking and supporting member 4 is in turn supported upon posts or struts 5 which rest at their bases on the bottom 6 of the tank.

The bottom of the lower filter member $3^x$ is provided with a head $3^k$ arranged to register with the head $7^a$ of a pipe 7 to which it is joined by means of the clamp shown in Fig. 4. This clamp is preferably made in four sections, $8^a$, $8^b$, $8^c$ and $8^d$. The two upper sections are secured around the neck joining the head $3^k$ with the body portion of the filter member $3^x$ by means of bolts 9, while the upper and lower clamping members are connected together by means of bolts 10 at right angles to the bolts 9. A gasket 11 of rubber or other suitable material is disposed between the upper and lower clamping members. The pipe 7 is provided with a rectangular portion $7^k$ which is supported by means of a central post or pillar 12.

The tank is provided with a top 13 through which an inlet pipe 14 extends, the latter being held in the top by means of a bushing 15 made of insulating material such as rubber. Through the center of the top 13 a pipe 16 projects being provided with a bushing 17 similar to the bushing 15. This pipe connects with a distributer such as that shown in Fig. 2; the latter is provided with radiating arms $16^a$ which are flattened at their ends as shown in Fig. 3 and which are expanded laterally as shown at $16^b$ in Fig. 2. A door or man-hole 18 is provided at one side of the pipe 16; it has a flange $18^a$ arranged to engage the top, a suitable gasket, of rubber or other material, 18ᵇ being interposed to form an air tight joint. The door 18 is firmly secured to the top by means of a locking flange 19 made of hard rubber and having bolts of similar material, one of the bolts 20 being sunk into the top of the tank and the other 21 extending through the door and being provided with nuts. This insures an air tight joint when the door is screwed down. At one side of the tank is a gage 22 for determining the depth of solution, while a pressure gage is shown at 23. A pipe 24 communicates with the interior of the tank and is provided with a bushing 25 similar to the bushing 15. The pipe 7 extends downwardly and laterally and passes through the side of the tank, this pipe also being provided with a bushing 26. Pipes 27 and 28 pass through the bottom of the tank and have suitable bushings 27ᵃ and 28ᵃ respectively.

Referring now to Fig. 1 it will be seen that I have provided a pump P which is connected with the pipe 16 leading to the distributer. A valve 16ᵛ is provided in the pipe 16. A pipe 29 also communicates with the pump P and is provided with a valve 29ᵃ. The pipe 27 has a valve 27ᵇ and is connected to the coupling member 30. A pipe 31 leads from the coupling member 30 to the pump P and is provided with a valve 31ᵃ. The pipe 7 also connects with the coupling member 30 and is provided with a valve 7ᵃ. A pipe 32 connects with the pipe 7 and is provided with a valve 32ᵃ. A pipe 33 is also connected with the coupling member 30 and is provided with a valve 33ᵃ. A valve 28ᵃ is provided for the pipe 28. On the opposite side of the tank an air pump P′ communicates by means of the pipe 24 with the interior of the tank.

From the foregoing description of the various parts of the device, the operation thereof may be readily understood. The upper part of the apparatus is charged through the door 18 with the finely divided ore and a suitable solvent. The valves 7ᵃ, 16ᵛ and 31ᵃ are now opened, the other valves all being closed, and the pump P is started. The ore and solvent, such as a dilute solution of sulfuric acid, flows by gravity from the pipe 7 into the centrifugal pump P (which should be lined with some material such as stoneware) where it is thoroughly agitated and mixed by the pump, passes through the pipe 16 into the distributing apparatus. The latter on account of the shape of its discharging nozzles, causes the material to be violently ejected, thus separating the particles from each other.

During the operation of the pump P air is admitted under pressure through the pipe 32, the valve 32ᵃ being opened. The air passing with the pulp and solvent down into the pump P is thoroughly mixed with the pulp, thereby furnishing a liberal supply of oxygen for the carrying on of the chemical reaction. While the ore is being agitated by means of the pump P, the pump P′ which is a vacuum pump is slowly operated. This causes a downward passage of the air through the stoneware filter and out through the pipe 24. The solvent is also drawn through the filter, at the same time passing back to the pump by means of the pipe 27, the valve 27ᵇ being opened. This operation draws off the air from which the oxygen has been extracted and thereby permits further fresh supplies of oxygen to be furnished to the pulp under treatment. After the metal (such as copper) has been brought into solution by the solvent, the valves 7ᵃ, 32ᵃ, and 27ᵇ are closed and air is permitted into the tank under pressure through the pipe 14. The vacuum pump P′ being in operation causes a vacuum in the lower part of the tank beneath the filter while the pressure of the air above the filter forces the solution containing the metal rapidly into the compartment below the filter. The operation of filtering being completed, the solution can be drawn off by gravity from the bottom compartment through the pipe 28 or the valves 27ᵇ and 31ᵃ may be opened and the solution can be pumped by the pump P through the pipe 29, (the valve 29ᵃ being opened) to any desirable place. The pulp may be then freed from the acid solution by admitting water through the pipe 14 and repeating the operation. After the acid solvent has been removed, a solution of cyanid of potassium or sodium may be admitted, and the gold and silver extracted, by the same method of operation. The cycle of the leaching operation and the bringing of the metals into solution being finished, the tank may be discharged rapidly by opening the valves 7ᵃ and 33ᵃ. Water and air under pressure may be now admitted through the pipe 14, thus forcing the now useless pulp down through the pipe 7 and out of the pipe 33. Instead of forcing the pulp out through the pipe 33 the valve 33ᵃ may be closed, the valves 29ᵃ and 31ᵃ being opened, and the valve 16ᵛ being closed, the pulp water may be admitted through the pipe 14 under pressure and the pulp washed through the pipe 7 into the pump P and thence pumped from the pipe 29 to any place where it is desirable to deposit the tailings.

It will be seen that the device, as described, provides a filter in which compressed air may be admitted above the filter and a vacuum produced below the filter thus resulting in the filtering of the solution in much less time than would occur by the action of gravity merely. Furthermore the apparatus may be used with acids or alkalis which could not be used with ordinary leaching apparatus on account of the injury to the apparatus.

With this device an alkali solvent may immediately follow an acid solvent, since the traces of acid may be readily removed by the treatment with water. Ordinarily this could not be done because it would take too long to do it but with my improved apparatus and the use of compressed air and the vacuum, the washing of the pulp to free it from either acid or alkali solutions may be quickly accomplished.

By the use of this apparatus a great reduction in the cost of extracting metals from their ores as well as in the time, is accomplished.

I claim:—

1. In a device for treating ores, a tank having an annular shoulder on its interior, a filter having a flange arranged to rest on said shoulder, means for rendering the joint between the filter and the shoulder air-tight, a pipe communicating with the filter at its bottom, said pipe extending exteriorly of said tank, a pump communicating with said pipe, a distributer disposed above said filter and means connecting said pump with said distributer.

2. In a device for treating ores, a cylindrical tank having an annular shoulder on its interior walls, the bottom and the top of the tank being closed, a cone-shaped porous filter having a flange arranged to rest on said annular shoulder, means for rendering the joint between the filter and the tank air-tight, a pipe communicating with the bottom of said cone-shaped filter, said pipe extending through the sides of the tank, means for joining said pipe to said filter, an air pump communicating with the space below said filter, a distributing device disposed above said filter, a pump communicating at one end with the pipe leading from said filter and having communication with said distributer at the other end.

3. In a device for treating ores, a tank, a filter disposed within said tank, and arranged to bear on the walls thereof, means for rendering the joint between the filter and the walls air-tight, said filter being composed of sections, and means for locking said sections together and for supporting them in their locked position, said means comprising an annular ring having flanges arranged to engage flanges on the filter and means for supporting said annular ring.

4. In a device for treating ores, a closed cylindrical tank, a central post or pillar carried by the bottom of the tank, an inclined pipe having a flange arranged to rest on said central partition, said pipe extending through the wall of the cylindrical tank, a cone-shaped filter section having a flange at its bottom arranged to register with the flange of said pipe, a gasket disposed between the flanges of the filter section, and the pipe, means for clamping said flanges together, said filter having a central opening arranged to register with the pipe.

5. In a device for treating ores, a closed cylindrical tank, a central post or pillar carried by the bottom of the tank, an inclined pipe having a flange arranged to rest on said central partition, said pipe extending through the wall of the cylindrical tank, a cone-shaped filter section having a flange at its bottom arranged to register with the flange of said pipe, a gasket disposed between the flanges of the filter section and the pipe, means for clamping said flanges together, said filter having a central opening arranged to register with the pipe, a second filter section forming a continuation of said first named section, the outer edges of said second named section engaging the walls of the tank and forming an air-tight joint therewith, and means for effecting an air-tight joint between the first named filter section and the second named filter section.

6. In a device for treating ores, a closed cylindrical tank, a central post or pillar carried by the bottom of the tank, an inclined pipe having a flange arranged to rest on said central partition, said pipe extending through the wall of the cylindrical tank, a cone-shaped filter section having a flange at its bottom arranged to register with the flange of said pipe, a gasket disposed between the flanges of the filter section and the pipe, means for clamping said flanges together, said filter having a central opening arranged to register with the pipe, a second filter section forming a continuation of said first named section, the outer edges of said second named section engaging the walls of the tank and forming an air-tight joint therewith, means for effecting an air-tight joint between the first named filter section and the second named filter section, said last named means comprising a ring having grooves arranged to receive tongues of both of said filter sections, and supports carried by the bottom of the tank for supporting said ring in position.

JOHN D. FIELDS.

Witnesses:
P. C. ALLEN,
B. D. McPHAIL.